(12) United States Patent
Kallarackal et al.

(10) Patent No.: US 11,542,100 B2
(45) Date of Patent: Jan. 3, 2023

(54) FLEXIBLE IMPACT BED AND A CONVEYOR BELT SYSTEM THEREOF

(71) Applicant: THEJO ENGINEERING LIMITED, Chennai (IN)

(72) Inventors: Manoj Joseph Kallarackal, Chennai (IN); Harikrishnan R Nair, Chennai (IN)

(*) Notice: Subject to any disclaimer, the term of this patent is extended or adjusted under 35 U.S.C. 154(b) by 0 days.

(21) Appl. No.: 17/400,163

(22) Filed: Aug. 12, 2021

(65) Prior Publication Data

US 2022/0048712 A1  Feb. 17, 2022

(51) Int. Cl.
*B65G 15/60* (2006.01)
*B65G 15/08* (2006.01)

(52) U.S. Cl.
CPC ............ *B65G 15/60* (2013.01); *B65G 15/08* (2013.01); *B65G 2207/28* (2013.01)

(58) Field of Classification Search
CPC .... B65G 15/60; B65G 15/08; B65G 2207/28; B65G 15/62
See application file for complete search history.

(56) References Cited

U.S. PATENT DOCUMENTS

| 4,793,470 | A | * | 12/1988 | Andersson | B65G 21/2081 198/841 |
| 9,296,564 | B2 | * | 3/2016 | Kuiper | B65G 15/62 |
| 2008/0006514 | A1 | * | 1/2008 | Ostman | B65G 15/62 198/823 |
| 2010/0072033 | A1 | * | 3/2010 | Daly | B65G 21/2081 198/836.4 |
| 2014/0061006 | A1 | * | 3/2014 | Gibbs | B65G 15/62 198/823 |
| 2021/0130103 | A1 | * | 5/2021 | Seo | B65G 39/125 |

* cited by examiner

*Primary Examiner* — Mark A Deuble
(74) *Attorney, Agent, or Firm* — Rumit Ranjit Kanakia

(57) ABSTRACT

The present subject matter relates to an impact bed system with an integrated shock absorber component (100) and a conveyor belt system thereof. The system (200) includes a flexible impact bed (202) including a plurality of cuboidal elements (204) arranged in an array, wherein the plurality of cuboidal elements are spatially coupled to each other; at least four extending elements (206) coupled to two opposite sides of the impact bed, wherein at least two extending elements are placed at each of the opposite sides of the impact bed; a pair of elongated cuboidal blocks (208) coupled to a mounting base plate (210), when in operation; at least four upright elongated components (214) coupled to the pair of elongated cuboidal blocks and the at least two support members; at least four shock absorber components coupled between the at least four upright elongated components and the at least four extending elements.

19 Claims, 5 Drawing Sheets

FLEXIBLE IMPACT BED AND A CONVEYOR BELT SYSTEM THEREOF

TECHNICAL FIELD

The present subject matter generally relates to conveyor belt systems, and more particularly, to the impact bed for supporting and bearing the loads transferred on to the conveyor belt system.

BACKGROUND OF THE INVENTION

This section is intended only to provide background information pertaining to the similar field of the present invention, and may be used only to enhance the understanding of the present subject matter and not as admissions of prior art.

Traditionally, from years, movable carts have been used for transferring of goods and materials from one location to another. Particularly, transferring of goods loaded on carts, wagons, and the like from one location (maybe initial or intermediate) to another (maybe intermediate or final). However, there were certain limitations with the application of carts such as heavy bulk loads required multiple carts, continuous manual monitoring that are susceptible to risks at high temperate zones such as furnaces, warehouses, and the like.

In order to overcome the above mentioned limitations, conveyor belt systems were introduced to transfer goods from one location to another. Furthermore, the conventional conveyor belt systems include a pair of pulleys (one is driver and other is driven) coupled with a conveyor belt. Moreover, when in operation, goods and materials are loaded on the conveyor belt that revolves on the pair of pulleys, and thereby transfer the loaded goods and materials from one location to another. Particularly, loading of the raw materials on the conveyor belts in the warehouses exert pressure force thereto, and thereby risks fatigue or breakage of the conveyor belt. Furthermore, load suspension arrangements have been developed to support the conveyor belts, when in operation, to avoid the risk of the fatigue or breakage. However, the conventional type load suspension arrangements are incapable of reducing fatigue or breakage generated thereto, thereby requiring and resulting into replacement of the entire conveyor belt system. Traditionally, the conventional load suspension arrangements are provided with multiple rollers arranged in an inside of the conveyor belts or endless loop in order to withstand the fluctuation of loads being suspended on thereupon.

In light of foregoing discussion, there is a need, to overcome the limitations associated with the conventional and traditional conveyor belt systems and load suspension arrangements implemented thereto, in the form of the rigidity of the load carrying structures, and improving the overall efficiency of the related systems.

SUMMARY OF INVENTION

The present subject matter aims to provide an enhanced and efficient conveyor belt system with an efficient impact bed having an integrated resilient shock absorber component and a flexible impact bed supporting and carrying the loads transferred on to the conveyor belt, of the type as illustrated herein, thereby improving the structural operability and the manoeuvrability thereto.

In accordance with an embodiment of the present subject matter, a flexible impact bed system is provided with a shock absorber component, such that the system includes a flexible bed, including a plurality of cuboidal elements arranged in an array, wherein the plurality of cuboidal elements are spatially coupled to each other; at least four extending elements coupled to two opposite sides of the impact bed, wherein at least two extending elements are placed at each of the opposite sides of the impact bed; a pair of elongated c-sections coupled to a rigid support, when in operation, wherein the pair of elongated c-sections are placed opposite to each other and running along the length of the impact bed and connected via at least two support members arranged at extreme ends; at least four upright elongated components coupled to the pair of elongated c-sections and the at least two support members, wherein the pair of elongated c-sections are coupled to a base of the at least four upright elongated components; at least four shock absorber components coupled between the at least four upright elongated components and the at least four extending elements; wherein each of the shock absorber component comprises a hollow cubical block attached with a base element, wherein the hollow cubical block includes openings at two opposite faces; a plurality of hardened elastic elements arranged inside the hollow cubical block; and a retractable element placed within the plurality of hardened elastic elements and the hollow cubical block, wherein the plurality of hardened elastic elements provide a resilient support to the retractable element, and the hollow cubical block provides a mounting base plate to the plurality of hardened elastic elements and the retractable element, when in operation. The pluralities of cuboidal elements are coupled to each other using metallic couplings.

BRIEF DESCRIPTION OF ACCOMPANYING DRAWINGS

The drawing/s mentioned herein discloses exemplary embodiments of the claimed invention. Detailed description and preparation of well-known compounds/substances/elements are omitted to not unnecessarily obscure the embodiments herein. Other objects, features, and advantages of the present subject matter will be apparent from the following description when read with reference to the accompanying drawings:

DETAILED DESCRIPTION OF INVENTION

Figure 1:
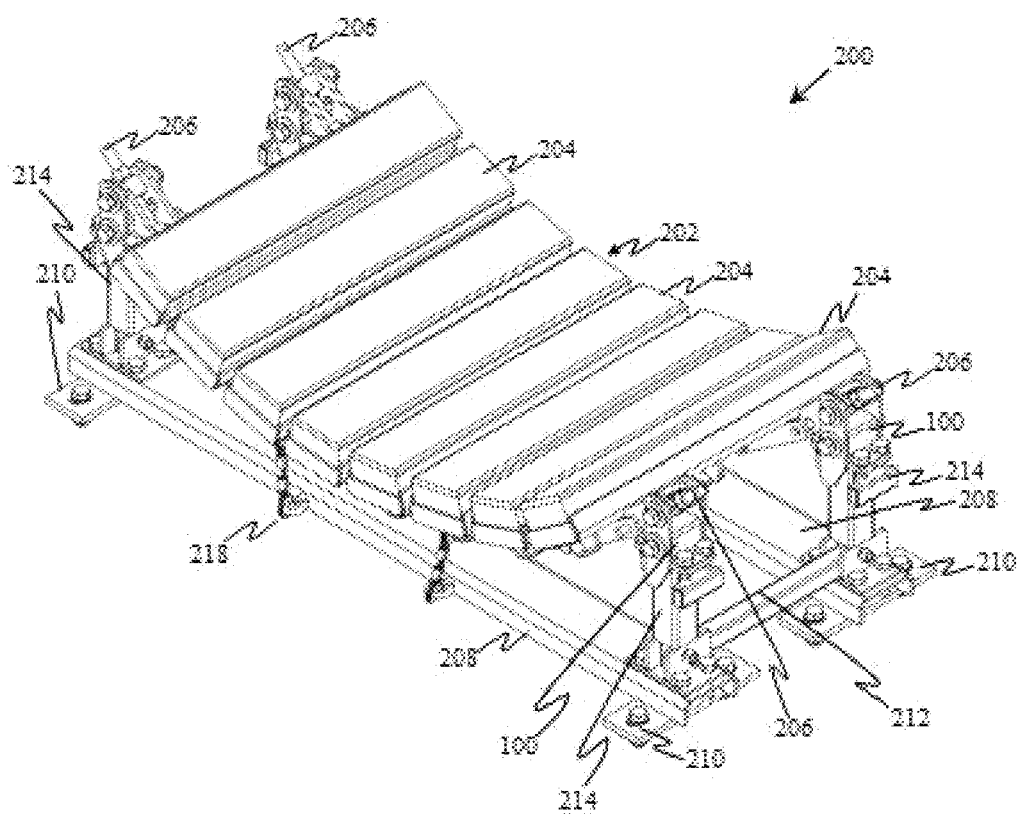
FIG. 1 represents an assembled view of an impact bed in integration with a shock absorber component, in accordance with an embodiment of the present subject, matter.

This section is intended to provide explanation and description of various possible embodiments of the present subject matter. The embodiments used herein, and the various features and advantageous details thereof are explained more fully with reference to non-limiting embodiments illustrated in the accompanying drawing's and detailed in the following description. The examples used herein are intended only to facilitate understanding of ways in which the embodiments may be practiced and to enable the person skilled in the art to practice the embodiments used herein. Also, the examples/embodiments described herein should not be construed as limiting the scope of the embodiments herein.

According to a primary embodiment of the present subject matter, there is described a an impact bed or impact bed system in integration with a shock absorber component, such that the impact bed system includes:

an impact bed including a plurality of cuboidal elements arranged in an array, wherein the plurality of cuboidal elements are spatially coupled to each other;

at least four extending, elements coupled to two opposite sides of the impact bed, wherein at least two extending elements are placed at each of the opposite sides of the impact bed;

a pair of elongated c-sections coupled to a rigid support, when in operation, wherein the pair of elongated c-sections are placed opposite to each other and running along the length of the impact bed, and the pair of elongated c-sections are connected via at least two support members arranged at extreme ends;

at least four upright elongated components coupled to the pair of elongated c-section sand the at least two support members, wherein the pair of elongated c-sections are coupled to a base of the at least four upright elongated components;

at least four shock absorber components coupled between the at least four upright elongated components and the at least four extending elements, wherein each of the shock absorber component includes:

a hollow cubical block attached with a base element, wherein the hollow cubical block includes openings at two opposite faces;

a plurality of hardened elastic elements arranged inside the hollow cubical block; and a retractable element placed within the plurality of hardened elastic elements and the hollow cubical block;

wherein the plurality of hardened elastic elements provide a resilient-support to the retractable element, and, the hollow cubical block provides a mounting base plate to the plurality of hardened elastic elements and the retractable element, when in operation;

wherein the at least four extending elements are coupled to the at least four extending elements in conjunction with the at least four shock absorber components, in correspondence to each other.

Throughout the description of the present subject matter, the term "conveyor belt system" refers to a carrying medium to transfer goods and materials from one location to another. The conveyor belt systems employ an impact bed, which according to present embodiment is a flexible impact bed according to an embodiment herein. Furthermore, the conveyor belt system includes two or more pulleys coupled to an endless loop or a conveyor belt. Moreover, the conveyor belt systems are configured to continuously transfer the goods and materials from one location to another. The conveyor belt or the endless loop used in the conveyor belt systems are manufactured using hardened elastic materials, and are configured to sustain the load placed thereupon. However, when in operation, there is fluctuation of loads, on the conveyor belt that results in, fatigue and failure. Therefore, the present subject matter seeks to provide a solution in the form of the resilient shock absorber component integrated with the traditional conveyor belt system for sustaining the fluctuation of loads therein, and significantly improving the efficiency and the lifespan of the system, when in operation. Additionally, an important characteristic of the conveyor belt system of the type as described herein in the context of the present subject matter lies in the inherent shape of the impact bed carrying the loads transported to the system, thereby providing the structural flexibility to operate, and augmenting the cumulative load carrying capacity and withstanding different kinds of forces and stresses exerted thereto.

The "impact bed system" means the system as described herein and that includes a "flexible impact bed". At some places, "impact bed system" and "impact bed" may be used interchangeably.

Referring FIG. 1, the present subject matter illustrates an impact bed system (200) that is coupled in or with a conveyor belt system, and the impact bed (202) is in integration with a shock absorber component (100), in accordance with an embodiment thereto. The impact bed (202) further includes one or more cuboidal elements (204), at least four extending elements (206), a pair of elongated c-sections (208), a mounting base plate (210), at least two support members (212), and at least four upright elongated components (214). The impact bed (202) includes one or more cuboidal elements (204) arranged in an array and spatially coupled to each other. Furthermore, at least four extending elements (206) are coupled to two opposite sides of the impact bed (202), such that at least two extending elements (206) are placed at each of the opposite sides of the impact bed (202).

According to an embodiment, the pair of elongated c-sections (208) provided within the impact bed system are coupled to a mounting base plate (210), when in operation, such that the pair of elongated c-sections (208) are placed opposite to each other and running along the length of the impact bed (202) and connected via, at least two support members (212) arranged at extreme ends.

Furthermore, the impact bed system (200) includes at least four upright elongated components (214) coupled to the pair of elongated c-sections (208) and the at least two support members (212), wherein the pair of elongated c-sections (208) are coupled to a base of the at least four upright elongated components (214).

Figure 4:
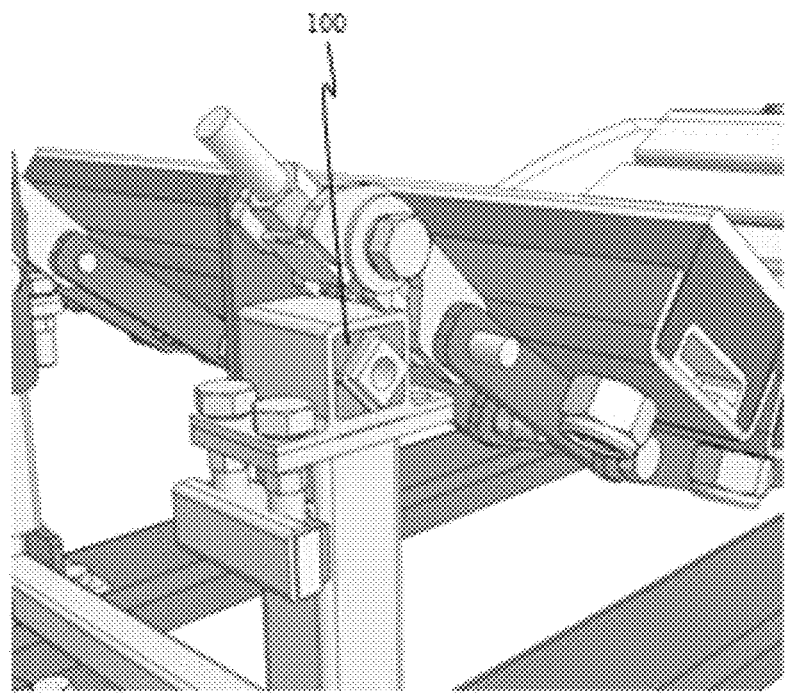
FIG. 4 represents an open perspective view of the shock absorber component integrated with the impact bed, in accordance with an embodiment of the present subject matter.

In addition to the abovementioned configuration of the conveyor belt system, it is in further accordance with an embodiment of the present subject matter that the conveyor belt system (200) of the type and arrangement as described herein is provided with a set of at least four shock absorber components (100), as shown in FIG. 4, coupled between the at least four upright elongated components (214) and the at least four extending elements (206).

Figure 3:
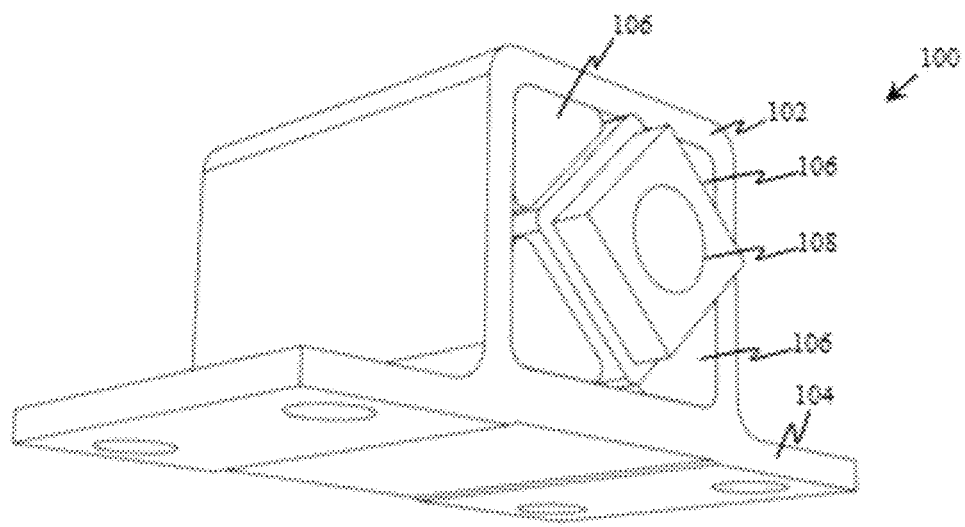
FIG. 3 represents a perspective view of the shock absorber component, in accordance with an embodiment of the present subject matter.

According to an embodiment, each of the shock absorber component (100) of the set of at least four shock absorber components comprises a hollow cubical block (102) attached with a base element (104), wherein the hollow cubical block includes openings at two opposite faces, as shown in FIG. 3. The shock absorber component (100) comprises a plurality of hardened elastic elements (106) arranged inside the hollow cubical block (102). The shock absorber component (100) further comprises a retractable element (108) placed within the plurality of hardened elastic elements (106) and the hollow cubical block (102). Furthermore, the plurality of hardened elastic elements (106) positioned inside the hollow cubical block (102) helps provide a resilient support to the retractable element (108), and the hollow cubical block (102) provides a mounting base plate to the plurality of hardened elastic elements (106) and the retractable element (108), when in operation.

In an embodiment, the hollow cubical block (102) and the base element (104) are integral to each other.

It is further in accordance with, an embodiment of the present subject matter that the shock absorber component (100) comprises a set of four hardened elastic elements (106) arranged inside the hollow cubical block (102). The set of four hardened elastic elements (106) are configured to robustly hold the retractable element (108) placed within the plurality of hardened elastic elements (106) and the hollow cubical block (102). More optionally, the shock absorber component (100) comprises a set of four hardened elastic elements (106) arranged inside the hollow cubical block (102). The said configuration of the number of hardened elastic elements (106) arranged inside the hollow cubical block (102) is in accordance with the requirement of the system as can be perceived by a person skilled in the art.

The hollow cubical block (102) and the retractable element (108), forming a part of the shock absorber component (100) as described herein in the present subject matter are manufactured using metal and/or metal alloys.

Furthermore, the plurality of hardened elastic elements (106) forming an integral part of the shock absorber component (100) is manufactured using hard fibres. Preferably, the plurality of hardened elastic elements (106) is manufactured using materials with elastic polymer that may be natural or synthetic, with said Shore D hardness lying in a range of 80 to 100, thereby serving the requirements of the system.

In an embodiment, the one or more of cuboidal elements are coupled to each other using metallic coupling.

Figure 2:
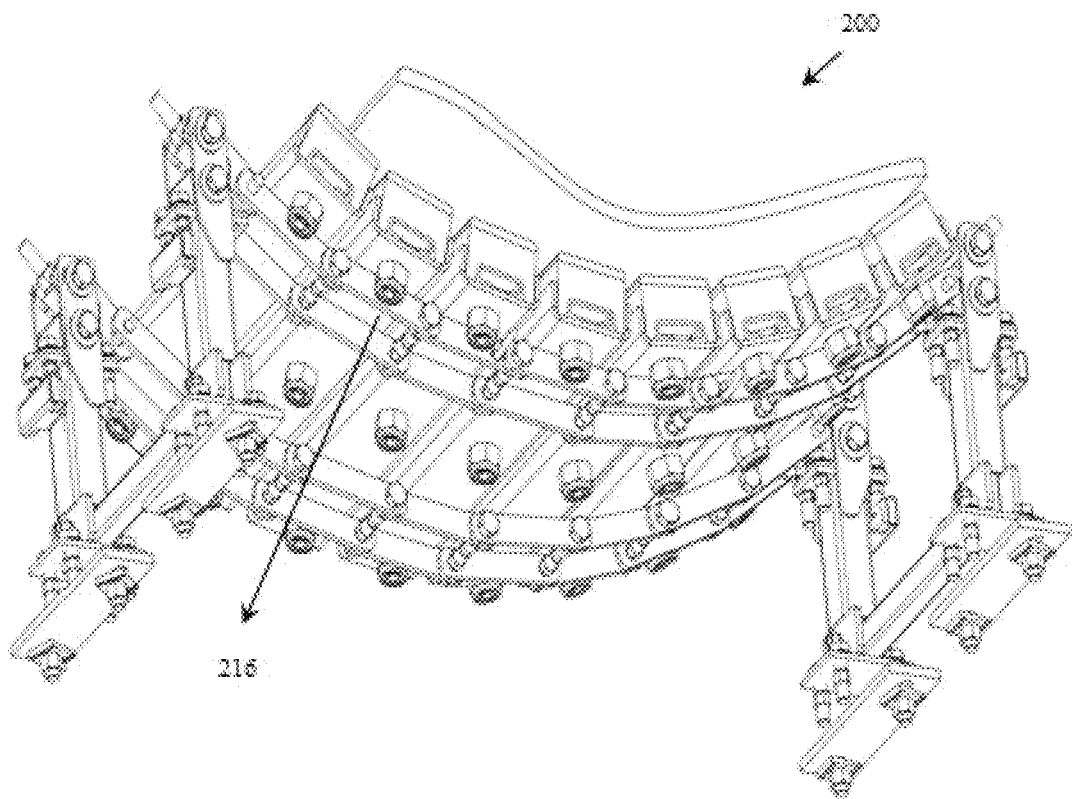
FIG. 2 represents a bottom view of the impact bed depicting the underneath of the impact bed, in accordance with an embodiment of the present subject matter.

According to an embodiment of the present subject matter, FIG. 2 represents a bottom view of the assembled impact bed system, highlighting the underside of the impact bed (202). The system (200) is assembled as a united whole suspended from the shock absorber component (100), serving as the mat surface for the pulleys to roll over. The plurality of the cuboidal elements (204) of the system (200) are provided with flexible links (216) positioned underneath the impact bed (202), thereby helping provide additional flexibility to the mounting structure. Furthermore, the system (200) is provided with arrestors (218), as shown in FIG. 1, placed between the plurality of cuboidal elements (204) at the underside of the impact bed (202) so as to arrest the swaying or lateral movement of the conveyor belt from one bed assembly to another.

Figure 5:
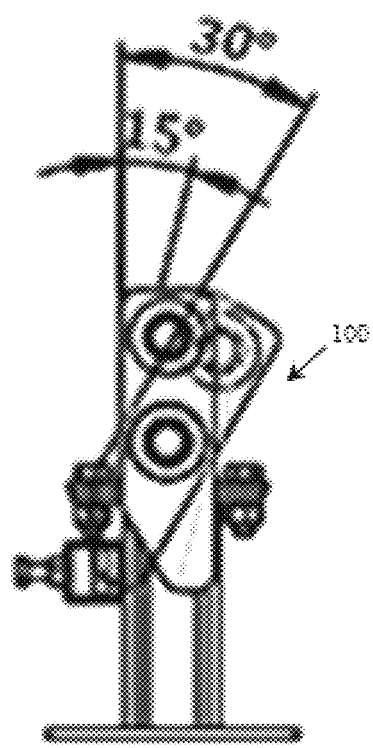
FIG. 5 represents a left side view of the shock absorber component integrated with the impact bed, in accordance with an embodiment of the present disclosure.

FIG. 5 illustrates a left side view of the shock absorber component (100) mounting the impact bed system (200) and withstanding the loads and forces exerted thereto, in accordance with an embodiment of the present disclosure. As depicted in FIGS. 1 and 5, the shock absorber component (100) is configured to shift the at least four extending elements (206) of the impact bed system (200) coupled with the impact bed (202) on each side of the impact bed (202) at an inclination ranging between 15 degrees and 40 degrees when subjected to loads, in accordance with the structural requirements of the conveyor belt systems or impact bed systems, and as can be calculated and perceived by a person skilled in the art, thereby helping provide the flexible U-shape in the form of a garland to the impact bed (202) and serving the structural flexibility thereof.

In another aspect, a conveyor belt system including the flexible impact bed system (200) for housing and supporting a conveyor belt of conveyor belt system is provided. In a preferred embodiment, the conveyor belt system having a flexible impact bed system (200) includes a flexible bad (202). The impact bed includes a plurality of cuboidal elements (204) arranged in an array, wherein the plurality of cuboidal elements (204) are spatially coupled to each other; at least four extending elements (206) of the system (200) coupled to two opposite sides of the impact bed (202), wherein at least two extending elements (206) are placed at each of the opposite sides of the impact bed (202); and a pair of elongated c-sections (208) of the system (200) coupled to a mounting base plate (210), when in operation, wherein the pair of elongated c-sections (208) are placed opposite to each other and running along the length of the impact bed (202), and the pair of elongated c-sections (208) are connected via at least two support members (212) arranged at extreme ends of the impact bed (202).

The impact bed (202) is further coupled with the extending elements (206) on each side of the impact bed (202) determines the troughing angle of the impact bed (202). The impact bed (202) housing the conveyor belt forms a natural U-shape, and the U-shape formation of the impact bed (202) is in the shape of a garland. The impact bed further includes four rigid supports (210) placed at four ends of the impact bed (202) and a number of cuboidal elements (204) are provided with flexible links (216) underneath the impact bed (202). There are arrestors (218) placed between the plurality of cuboidal elements (204) at the underside of the impact bed (202).

As will be readily apparent to a person skilled in the art, the present subject matter may easily be produced in other specific forms without departing from its essential composition and properties. The present embodiments should be construed as merely illustrative and non-restrictive and the scope of the present subject matter being indicated by the claims rather than the foregoing description, and all changes which come within therefore intended to be embraced therein.

We claim:

1. An impact bed system integrating a flexible impact bed, the system comprising:
   an impact bed including a plurality of cuboidal elements arranged in an array, wherein the plurality of cuboidal elements are spatially coupled to each other;
   at least four extending elements coupled to two opposite sides of the impact bed, wherein at least two extending elements are placed at each of the opposite sides of the impact bed;
   a pair of elongated c-sections coupled to a mounting base plate, when in operation, wherein the pair of elongated c-sections are placed opposite to each other and running along the length of the impact bed, and the pair of elongated c-sections are connected via at least two support members arranged at extreme ends of the impact bed;
   at least four upright elongated components coupled to the pair of elongated c-sections and the at least two support members, wherein the pair of elongated c-sections are coupled to a base of the at least four upright elongated components;
   at least four shock absorber components coupled between the at least four upright elongated components and the at least four extending elements; wherein each of the shock absorber component comprising:
   a hollow cubical block attached with a base element, wherein the hollow cubical block includes openings at two opposite faces;
   a plurality of hardened elastic elements arranged inside the hollow cubical block; and a retractable element placed within the plurality of hardened elastic elements, and the hollow cubical block;

wherein the plurality of hardened elastic elements provide a resilient support to the retractable element, and the hollow cubical block provides a mounting base plate to the plurality of hardened elastic elements and the retractable element, when in operation;

wherein the at least four extending elements are coupled to the at least four extending elements in conjunction with the at least four shock absorber components, in correspondence to each other.

2. The system as claimed in claim 1, wherein coupling of the impact bed with the extending elements on each side of the impact bed determines the troughing angle of the impact bed.

3. The system as claimed in claims 1 and 2, wherein the impact bed housing the conveyor belt forms a natural U-shape.

4. The system as claimed in claim 3, wherein the U-shape formation of the impact bed is in the shape of a garland.

5. The system as claimed in claim 1, wherein there are four rigid supports placed at four ends of the impact bed.

6. The system as claimed in claim 1, wherein the plurality of cuboidal elements are provided with flexible links underneath the impact bed.

7. The system as claimed in claim 1, wherein there are arrestors placed between the plurality of cuboidal elements at the underside of the impact bed.

8. The system as claimed in claim 1, wherein the hollow cubical block and the base element of the shock absorber component are integral to each other.

9. The system as claimed in claim 1, wherein the shock absorber component additionally comprises a set of three hardened elastic elements arranged inside the hollow cubical block.

10. The system as claimed in claim 1, wherein the shock absorber component additionally comprises a set of four hardened elastic elements arranged inside the hollow cubical block.

11. The system as claimed in claim 1, wherein the hollow cubical block of the shock absorber component is manufactured using metal and/or metal alloys.

12. The system as claimed in claim 1, wherein the retractable element of the shock absorber component is manufactured using metal and/or metal alloys.

13. The system as claimed in claim 1, wherein the plurality of hardened elastic elements of the shock absorber component is manufactured using hard fibres.

14. The system as claimed in any of the preceding claims, wherein the plurality of the cuboidal elements are coupled to each other using metallic couplings.

15. A conveyor belt system integrating an impact bed system for housing and supporting a conveyor belt of a conveyor belt system comprising:

a flexible impact bed;

a plurality of cuboidal elements arranged in an array, wherein the plurality of cuboidal elements are spatially coupled to each other;

at least four extending elements of the system coupled to two opposite sides of the impact bed, wherein at least two extending elements are placed at each of the opposite sides of the impact bed;

a pair of elongated c-sections of the system coupled to a mounting base plate, when in operation, wherein the pair of elongated c-sections are placed opposite to each other and running along the length of the impact bed, and the pair of elongated c-sections are connected via at least two support members arranged at extreme ends of the impact bed;

at least four upright elongated components coupled to the pair of elongated c-sections and the at least two support members, wherein the pair of elongated c-sections are coupled to a base of the at least four upright elongated components;

at least four shock absorber components coupled between the at least four upright elongated components and the at least four extending elements; wherein each of the shock absorber component comprising:

a hollow cubical block attached with a base element, wherein the hollow cubical block includes openings at two opposite faces;

a plurality of hardened elastic elements arranged inside the hollow cubical block; and a retractable element placed within the plurality of hardened elastic elements, and the hollow cubical block;

wherein the plurality of hardened elastic elements provide a resilient support to the retractable element, and the hollow cubical block provides a mounting base plate to the plurality of hardened elastic elements and the retractable element, when in operation;

wherein the at least four extending elements are coupled to the at least four extending elements in conjunction with the at least four shock absorber components, in correspondence to each other.

16. The conveyor belt system as claimed in claim 15, wherein coupling of the impact bed with the extending elements on each side of the impact bed determines the troughing angle of the impact bed.

17. The conveyor belt system as claimed in claim 16, wherein the impact bed housing the conveyor belt forms a natural U-shape.

18. The conveyor belt system as claimed in claim 17, wherein the U-shape formation of the impact bed is in the shape of a garland.

19. The conveyor belt system as claimed in claim 15, wherein there are four rigid supports placed at four ends of the impact bed, the plurality of cuboidal elements are provided with flexible links underneath the impact bed and wherein there are arrestors placed between the plurality of cuboidal elements at the underside of the impact bed.

* * * * *